Oct. 12, 1954

H. STUVA 2,691,363

PERCOLATING STOCK TANK HEATER

Filed Nov. 29, 1951

INVENTOR.
Harry Stuva,

BY Victor J. Evans & Co.

ATTORNEYS

Oct. 12, 1954

H. STUVA 2,691,363

PERCOLATING STOCK TANK HEATER

Filed Nov. 29, 1951

INVENTOR.
Harry Stuva,
BY Victor J. Evans & Co.
ATTORNEYS

Oct. 12, 1954  H. STUVA  2,691,363
PERCOLATING STOCK TANK HEATER
Filed Nov. 29, 1951  3 Sheets-Sheet 3

INVENTOR.
Harry Stuva,
BY Victor J. Evans & Co.
ATTORNEYS

Patented Oct. 12, 1954

2,691,363

UNITED STATES PATENT OFFICE 2,691,363

PERCOLATING STOCK TANK HEATER

Harry Stuva, Corning, Iowa

Application November 29, 1951, Serial No. 258,937

5 Claims. (Cl. 119—73)

This invention relates to devices for heating water in stock watering troughs and tanks, and in particular a percolating heater having a heat exchanging chamber therein through which water may be recirculated and percolated continuously with a comparatively small amount of heat.

The purpose of this invention is to provide water heating means in a stock tank whereby water is recirculated or percolated continuously without moving parts and with heat providing the circulating means.

Various attempts have been made to prevent water freezing in stock watering troughs and tanks and where water is circulated or recirculated continuously with motors or other prime movers, the parts, being subjected to extreme temperatures where oil and grease become stiff wear rapidly and it is difficult to insure continuous operation thereof.

With this thought in mind this invention contemplates recirculating means in the form of a percolator for stock watering troughs whereby the water is recirculated by heat and wherein with the water recirculating continuously, a comparatively small amount of heat is required.

The object of this invention is, therefore, to provide means for constructing a percolating unit for stock watering tanks whereby water is recirculated continuously by the application of heat to a unit through which the water passes.

Another object of the invention is to provide a heat actuated water circulating device for stock watering troughs and tanks that may be incorporated in tanks now in use.

Another object of the invention is to provide a percolating unit for stock watering tanks that may be used to provide water for cattle and other stock and also water for hogs, poultry and the like.

A further object of the invention is to provide a percolating unit for stock watering tanks which is of a simple and economical construction.

With these and other objects and advantages in view the invention embodies a compartment having open ends extended through a stock watering tank with a percolating unit having a burner positioned below an element thereof mounted in the compartment, with the percolating unit adapted to withdraw water from the tank, raise the temperature of the water and discharge the water back into the tank and with the unit also including means for discharging water into lower stock watering tanks or troughs such as troughs for watering hogs and the like.

Other features and advantages of the invention will appear from the following description taken in connection with the drawings wherein.

Figure 1:
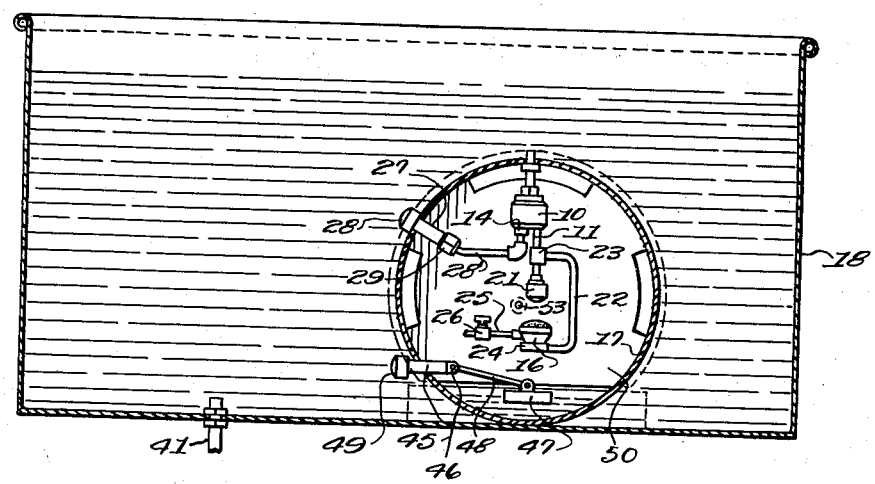
Figure 1 is a longitudinal section through a stock watering tank showing a percolating unit in a cylindrical tube extended through the tank.
Figure 2:
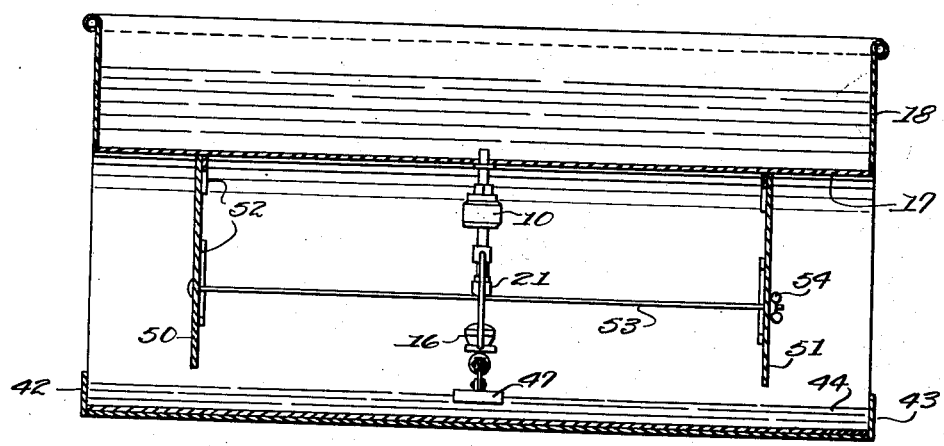
Figure 2 is a cross section through the tank shown in Figure 1, showing a longitudinal section through the tube extended through the tank and showing upper and lower watering tanks or compartments.
Figure 3:
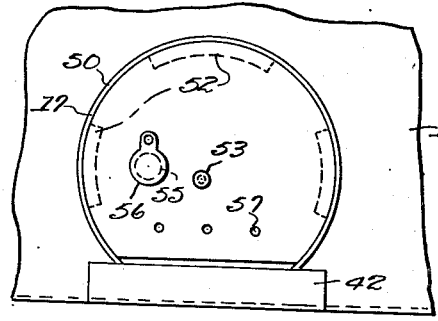
Figure 3 is a side elevational view showing part of the tank shown in Figure 1 and illustrating a cover or baffle extended across the tubular compartment and spaced inwardly from each end of the tube.

Referring now to the drawings wherein like reference characters denote corresponding parts the percolating unit of this invention includes a water distribution chamber 10 having a tubular heater connection 11 extended upwardly into the lower part thereof, a discharge connection 12 with a ball valve 13 therein, a sleeve 14 having a valve 15 therein providing an inlet connection, a burner or heater 16, and a compartment 17 in which the percolating elements are mounted and which extend through a stock watering tank 18.

The casing of the chamber 10 is provided with a threaded opening 19 through which the tube 11 extends and the lower end of the tube 11 is provided with a plug 20 on which a cap 21 is threaded providing a heating chamber.

In the design illustrated in Figure 1 the cap 20 is positioned above the burner 16, the burner being suspended by a bracket 22 from the tube 11 with a fitting 23 mounted on the tube 11 and with the burner 16 positioned in a ring 24 at the lower end of the bracket. The burner 16 is provided with a supply connection 25 having a valve 26 therein.

Also in the design illustrated in Figure 1 the chamber 10 is supplied with water from the tank 18 through a unit 27 having a strainer 28 in the outer end and a coupling 29 on the inner end by which the unit is connected to the inlet connection 14 of the chamber 10 with a tube 28' and a fitting 29.

The sleeve 14 is provided with a web 30 having an opening providing a valve seat therein and the ball valve 15 is urged, by gravity upon the seat around the opening, which is indicated by the numeral 31. A bushing 32 having a square opening 33 in the upper end is threaded into the upper end of the sleeve 14 to retain the ball in the sleeve.

The discharge tube or connection 12 is threaded into a boss 34 of a plug 35 threaded into the upper end of the chamber or casing 10 and the plug is provided with a cup shaped liner 36 having a square opening 37 therein which permits the escape of water through the corners with the ball 13 held upwardly above the seat 38 which is provided in a bushing 39 threaded in the liner 36 and provided with a passage 40. The parts are positioned whereby the ball 13 is free to be moved upwardly from the seat 38 by pressure of water in the chamber 10.

With the parts arranged in this manner heat applied to water in the cap 21 causes the heated water to travel upwardly through the center of the tube 11 with the cooler water entering the chamber 10 from the inlet connection traveling downwardly around the inner surface of the tube 11 and the pressure of the expanding water holds the ball 15 against the seat in the opening 31 and raises the ball 13 above the seat 38 in the bushing 39.

By this means water heated in the cap 21 passes upwardly into the chamber 10 and through the connection 12 into the tank 18.

The cold water supplied through the inlet connection may be taken from the tank 18 to the unit 27 or the connection may be connected to a suitable source of water supply.

In the design illustrated in Figure 1 tank 18 is provided with a water supply connection 41.

The tubular compartment 17 is also provided with ends 42 and 43 which provide a hog watering trough 44 in the lower part and the trough 44 is supplied with water from the tank 18 through a unit 45, similar to the unit 27 except that it is provided with a float actuated valve 46 with a float 47 connected to the valve with an arm 48. The outer end of the unit 45 is provided with a strainer 49, similar to the strainer 28 of the unit 27.

The tube 17 is also provided with closures or baffles 50 and 51 which are attached to flanges 52 extended inwardly from the inner surface of the tube and the baffles are retained in spaced relation with a rod 53 having a thumb nut 54 on one end.

The baffles 50 and 51 may also be provided with sight openings 55 having cover plates 56 and air vents 57 may be provided through the lower parts.

Figure 4:
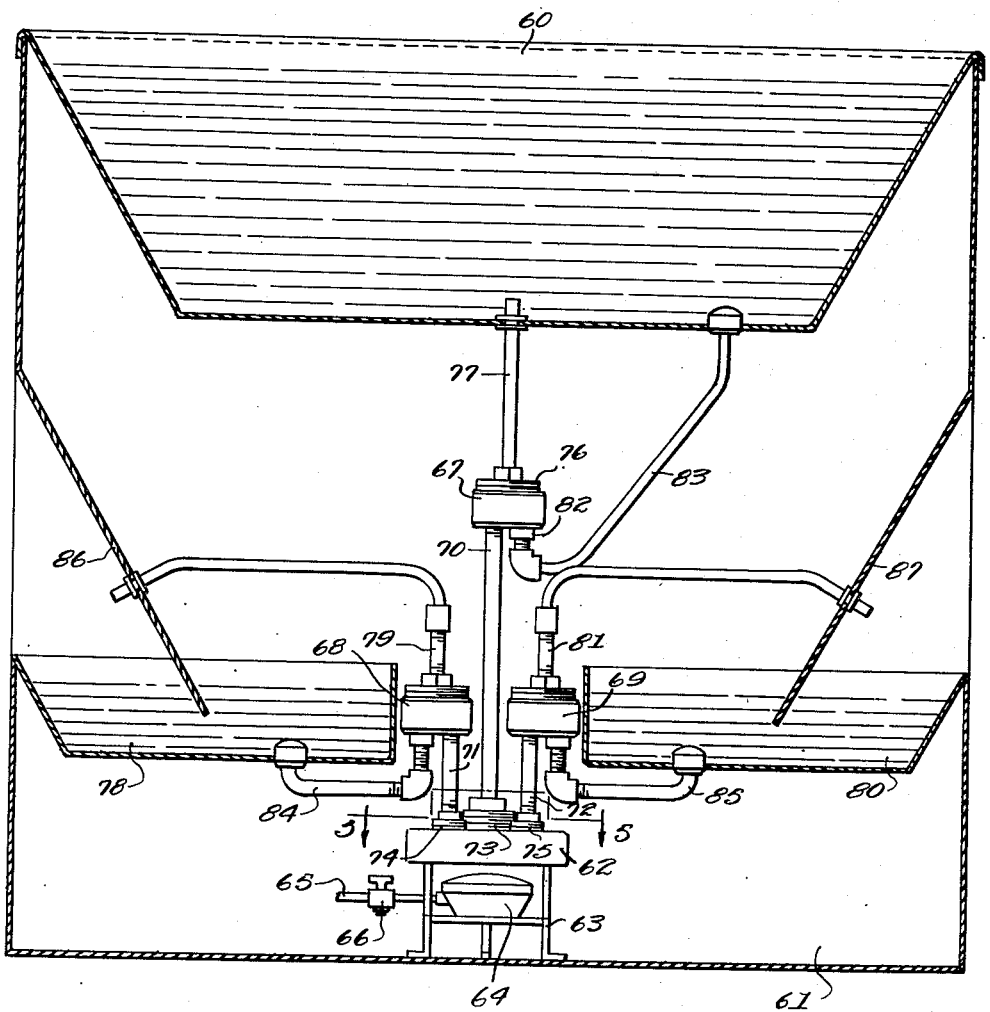
Figure 4 is a cross section similar to that shown in Figure 2 illustrating a modification wherein percolating units are provided for each section of the tank or trough.
Figure 5:
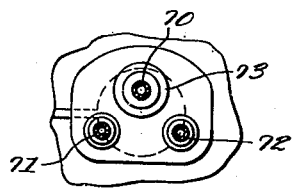
Figure 5 is a sectional plan taken on line 5—5 of Figure 4 showing individual connections of the percolating units to the main heating element.
Figure 6:
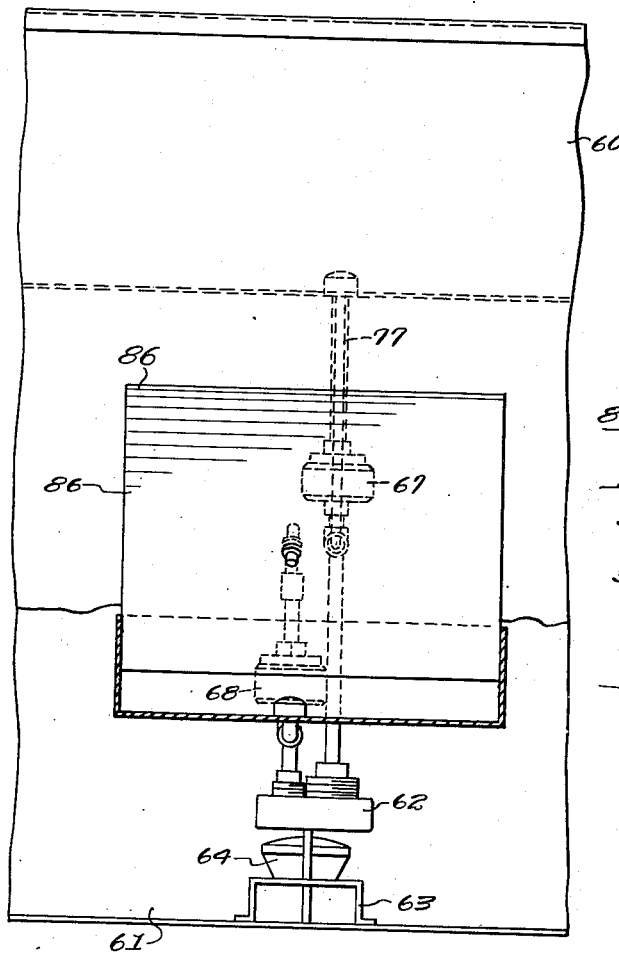
Figure 6 is a detail showing a side elevational view of the stock watering tank illustrated in Figure 4 with parts broken away showing one of the lower troughs in section.

In the design illustrated in Figures 4, 5 and 6 the stock watering tank 60 is provided with a transversely disposed compartment 61 and a heating element 62 mounted on a stand 63 in the compartment 61 is positioned above a burner 64 that is provided with a fuel connection 65 having a valve 66 therein.

The element 62 is connected to chambers 67, 68 and 69, similar to the chamber 10 with tubular connections 70, 71 and 72, respectively, the connections 70, 71 and 72 being similar to the tubular connection 11 whereby water heated in the element 62 passes upwardly through the tubes into the percolating chambers.

The tube 70 is connected to the element 62 with a plug 73 and the tubes 71 and 72 are connected to the element by similar plugs 74 and 75, respectively.

Each of the chambers 67, 68 and 69 is provided with a plug 76, similar to the plug 35 of the chamber 10 and the plugs are provided with ball valves similar to the valve 13. The plug 76 of the chamber 67 is connected to the tank 60 with a discharge connection 77, the plug of the chamber 68 is connected to a hog watering tank 78 with a discharge connection 79 and the plug 76 of the chamber 69 is connected to a similar hog watering tank 80 with a connection 81.

Each of the chambers 67, 68 and 69 is provided with a sleeve 82, similar to the sleeve 14, providing an inlet connection and the inlet connections of the chambers are connected to the tanks 60, 78 and 80, respectively with connections 83, 84 and 85.

Inwardly sloping baffles 86 and 87 are positioned above and spaced from the ends of the hog watering troughs 78 and 80 and the discharge connections 79 and 81 are fixedly mounted in the baffles 86 and 87, respectively, as shown.

Figure 7:
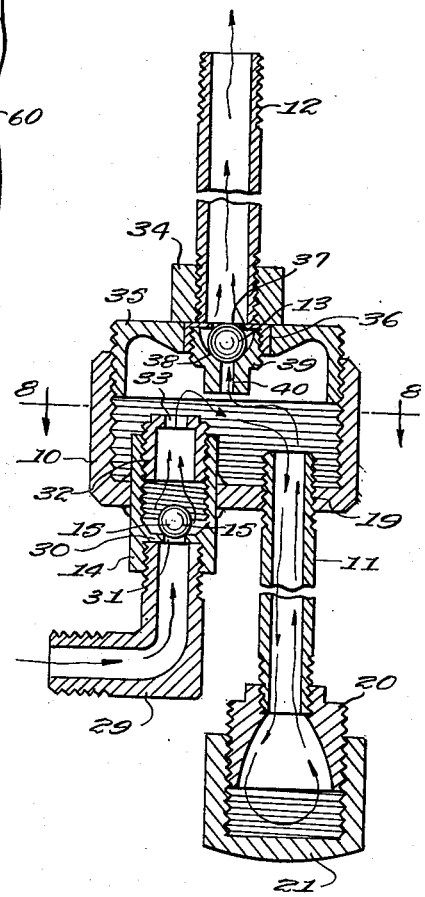
Figure 7 is an enlarged vertical section through one of the percolating units, showing, in particular, the units illustrated in Figure 1.
Figure 8:
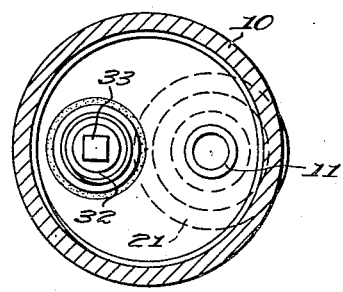
Figure 8 is a sectional plan taken on line 8—8 of Figure 7 showing the body of the percolating unit.

With the parts arranged in this manner the heating element 62 functions similar to the element 21 shown in Figure 7 whereby water heated therein passes upwardly through the connections 70, 71 and 72 causing hot water in the chambers 67, 68 and 69 to pass through the discharge connections and into the water tank.

By this means water in the tanks is recirculated continuously and the burners may be set so that the water remains at a constant temperature.

It will be understood that other modifications may be made in the design and arrangement of the parts without departing from the spirit of the invention.

What is claimed is:

1. A stock watering device comprising a tank, a compartment extended through the lower part of the tank, a water distribution chamber positioned in said compartment and having a discharge connection extending from the upper part thereof to the interior of the tank and an inlet connection extending from the lower part thereof into the tank, a vertically disposed depending tube extended from said water distribution chamber and having a heating chamber in the lower end thereof, and a heating element in the compartment and positioned below said heating chamber for applying heat to the heating chamber on the lower end of the vertically disposed tube whereby water heated in the said heating chamber passes upwardly through said water distribution chamber into the tank with water from the tank being drawn into the water distribution chamber to replace heated water passing upwardly through the said discharge connection.

2. A stock watering device as described in claim 1 wherein check valves are provided in the inlet and discharge connections of the said water distribution chamber.

3. A stock watering device comprising a tank, a housing extended through the lower part of the tank, plates extended across the ends of the housing providing a watering trough in the lower part thereof, baffles extended across the housing and spaced from the ends thereof, a heat exchanger positioned in the housing, a vertically disposed connection depending from said heat exchanger and having a heating chamber on the lower end, a heating element in the housing and positioned to apply heat to said heating chamber on the lower end of said vertically disposed connection, an inlet connection extended from the lower part of the heat exchanger to the interior of the tank, a check valve in said inlet connection preventing flow of fluid from the heat exchanger to the tank, a discharge connection from said heat exchanger to the tank, and a valve in said discharge connection preventing flow of fluid from the tank to the heat exchanger.

4. A stock watering device as described in claim 3 wherein a float control connection is provided from the stock watering tank to the trough in the lower part of the housing.

5. A stock watering device comprising a tank having an open compartment extended through the lower part thereof, a heat exchanger positioned in said open compartment of the tank, a vertically disposed depending tube having a heating chamber on the lower end extended from said heat exchanger, a heating element positioned below the said heating chamber, an inlet connection extending from the lower part of the heat exchanger to the tank, a check valve in said inlet connection preventing flow of fluid from the heat exchanger to the tank, a discharge connection extended from said heat exchanger to the tank and a valve in said discharge connection preventing flow of fluid from the tank to the heat exchanger.

References Cited in the file of this patent

UNITED STATES PATENTS

| Number | Name | Date |
|---|---|---|
| 471,827 | Rees | Mar. 29, 1892 |
| 894,312 | Brown | July 28, 1908 |
| 1,220,404 | Eaton | Mar. 27, 1917 |
| 1,459,408 | Lockett | June 19, 1923 |
| 1,528,435 | Kielsmeier | Mar. 3, 1925 |
| 1,602,606 | Dierks | Oct. 12, 1926 |
| 1,649,009 | Zachte | Nov. 15, 1927 |
| 1,786,049 | Zoeller | Dec. 23, 1930 |
| 1,835,352 | Stangl | Dec. 8, 1931 |
| 2,490,824 | Meisner | Dec. 13, 1949 |